July 24, 1934.   T. V. BUCKWALTER   1,967,808
TRUCK
Filed May 18, 1933   2 Sheets-Sheet 2
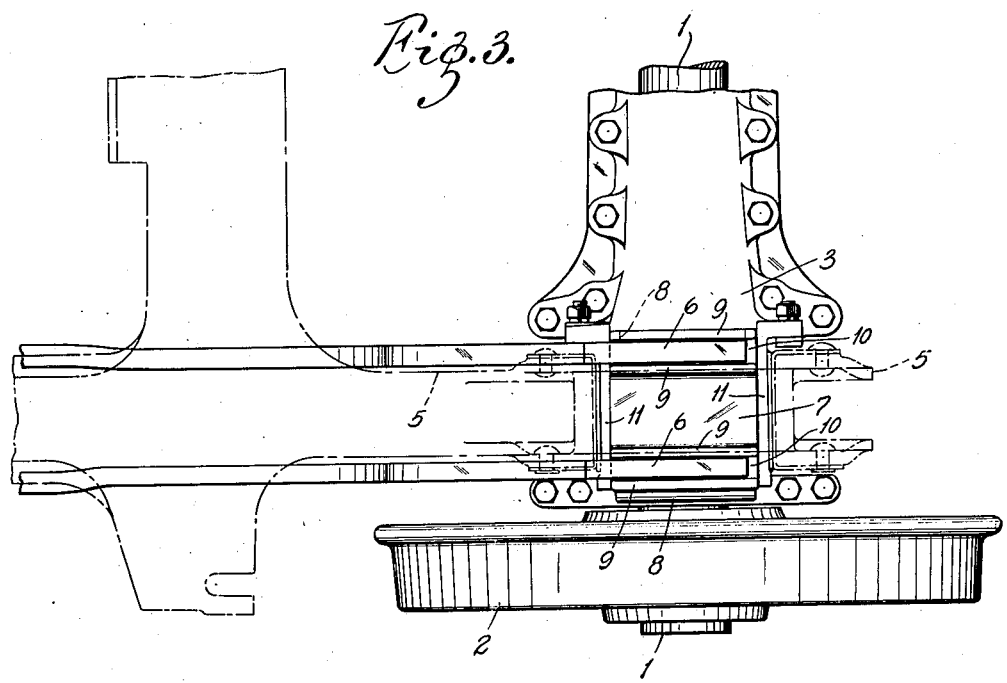
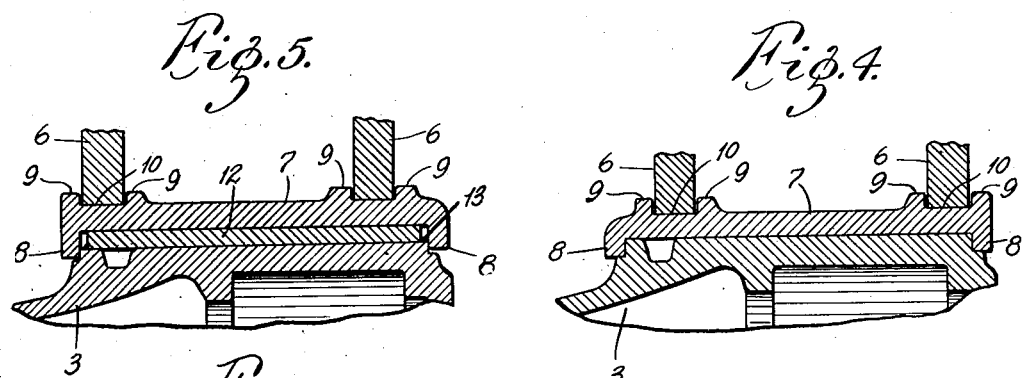
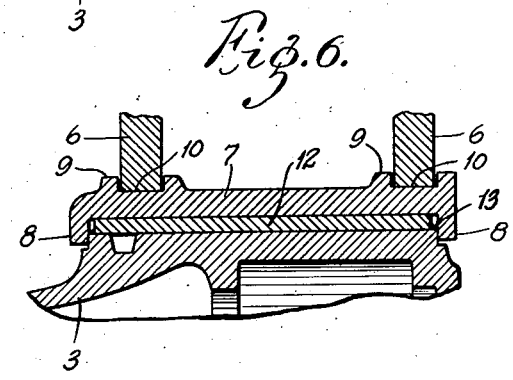
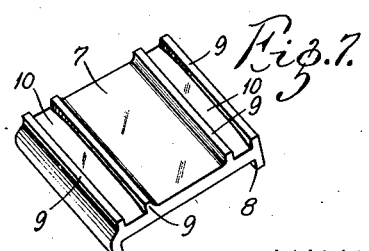
INVENTOR:
Tracy V. Buckwalter,
by Lauten & Gravely,
HIS ATTORNEYS Patented July 24, 1934

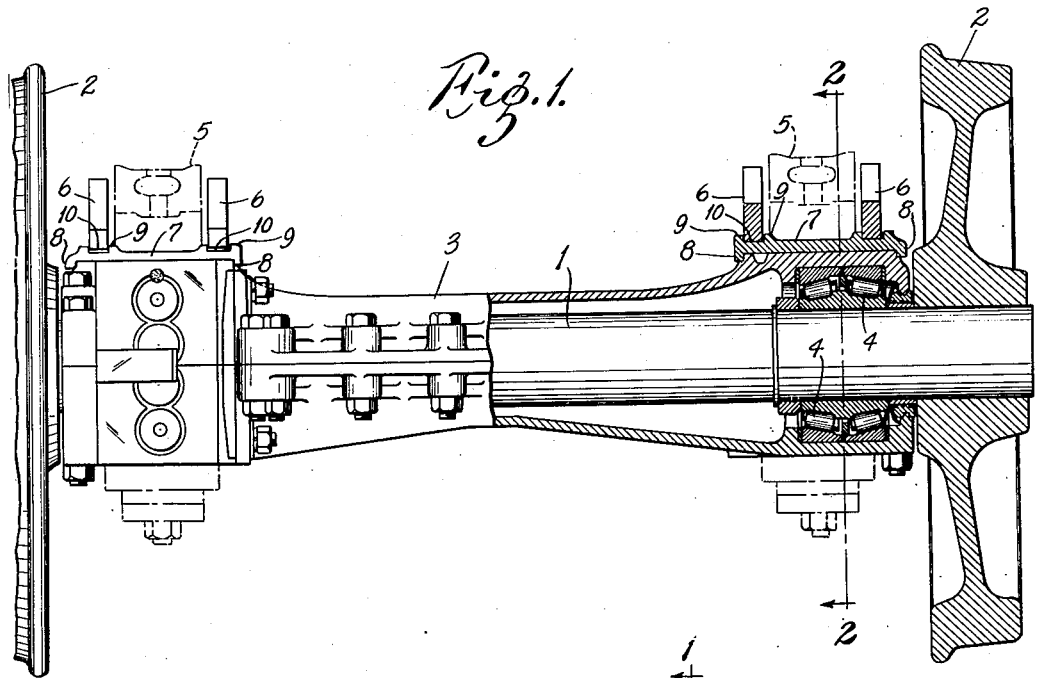
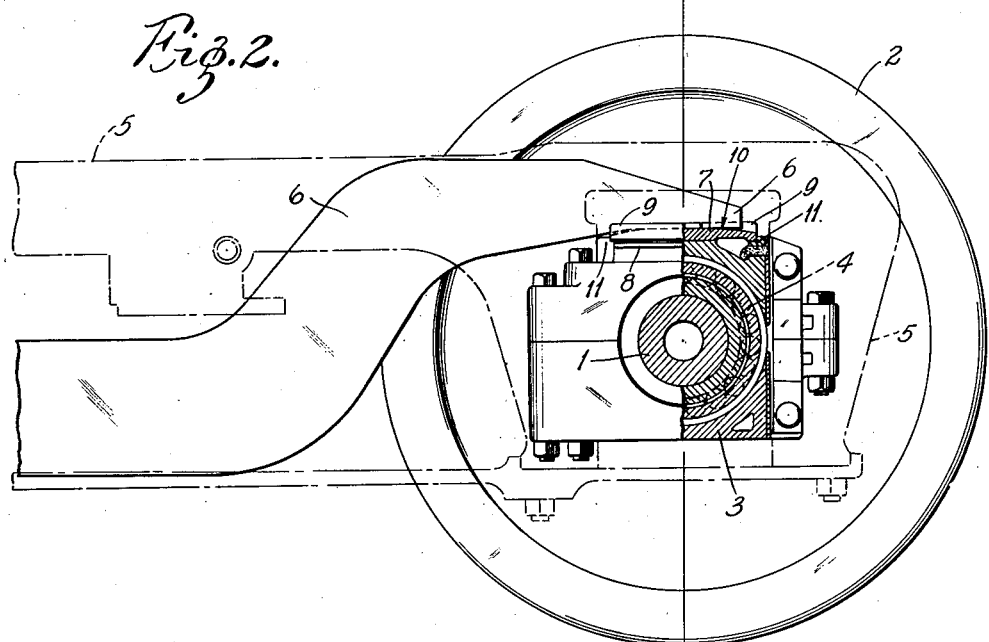

1,967,808

UNITED STATES PATENT OFFICE 1,967,808

TRUCK

Tracy V. Buckwalter, Canton, Ohio, assignor to The Timken Roller Bearing Company, Canton, Ohio, a corporation of Ohio Application May 18, 1933, Serial No. 671,598

8 Claims. (Cl. 295—36)

This invention relates to trucks of the kind used with locomotives and passenger cars. There are a great many trucks of this type now in service and capable of continued service for many years more. Trucks of this type have been equipped with plain bearings and, as they have not been standardized, they differ widely in their dimensions, particularly the distance between their side frame centers, the spread between adjacent equalizers, and the height from the center of the axle to the bottoms of the equalizers.

The object of the present invention is to provide means whereby a roller bearing axle construction suitable for replacement for a plain bearing axle construction in any truck of this type may be adapted for use with a like truck of different dimensions. The invention consists principally in modifying the ends of the housing of such a roller bearing axle construction to removably receive and engage plates specially adapted for cooperation with the side frames and equalizer bars of the old trucks.

In the accompanying drawings, wherein like numerals refer to like parts wherever they occur, Fig. 1 is a view of a construction embodying my invention, said view being partly in elevation and partly in section along the line 1—1 in Fig. 2, Fig. 2 is a view partly in elevation and partly in section on the line 2—2 in Fig. 1, Fig. 3 is a fragmentary plan view of said construction, Fig. 4 is an enlarged fragmentary section, similar to Fig. 1, showing the adapter plate reversed end for end to accommodate a truck having a wider spread between equalizer bars, Fig. 5 is a similar view, showing a shim interposed between the adapter plate and the axle housing to accommodate a truck having equalizer bar seats that are located a greater distance from the axle than the truck shown in Fig. 1, the position of the adapter plate corresponding to that shown in Fig. 1, Fig. 6 is a view similar to Fig. 5 showing the adapter plate turned end for end; and Fig. 7 is a perspective view of the adapter plate.

The construction illustrated in the accompanying drawings comprises a live axle 1 having wheels 2 secured at the ends thereof, a housing 3 surrounding said axle and taper roller bearings 4 with their inner bearing members fixed to the axle and their outer bearing members seated in the ends of the housing. Said construction also comprises side frame members 5 with pedestal jaws which straddle the ends of the housings, and equalizer bars 6 on opposite sides of the respective frame members and with their ends supported by the ends of the housing. Such construction is not described specifically herein because no claim is made thereto in this application.

According to the present invention, the ends of the equalizer bars do not rest directly upon the ends of the axle housing but upon adapter plates 7 mounted on said ends and engaged therewith. Each of the adapter plates is made with its under face conforming to the top face of the enlarged end of the housing; and is provided with downturned ribs or flanges 8 along its inner and outer ends. The top or upper face of the adapter plate is provided with two pairs of ribs or lugs 9 that extend transversely of the housing and serve to define the seats 10 for their respective equalizer bars. The adapter plate is seated flatwise on the enlarged end of the housing with its outer flange resting in a rabbet or groove provided therefor in the top edge of the housing close to the car wheel, and with its inner flange lapping the inner end of said enlarged portion of the housing and substantially in contact therewith. The front and back sides of the adapter plate lie close to and substantially in contact with upstanding ribs or flanges 11 provided therefor along the front and back corners of the housing and extending longitudinally of the housing. By this or other suitable means, the adapter plate is seated on the housing and blocked against shifting, its downturned flanges engaging the inner and outer shoulders of the enlarged portion of the housing and the upstanding flanges of the housing engaging the front and back sides of the adapter plate.

Each of the adapter plates is reversible end for end; that is, it may be mounted on the end of the axle housing with either of its own ends outermost. The pairs of ribs on its upper face are unequal distances from the ribs 8 on the adjacent ends of said plate and, consequently, reversal of the plate end for end shifts endwise of the axle the point that is midway between said pairs of ribs and which coincides with the frame center line. By this arrangement, the adapter plate will, in one position, accommodate frames whose centers are one distance apart; and, when reversed end for end, the same adapter plate will accommodate frames whose centers are a different distance apart.

Trucks differ with respect to the vertical distance from the center of the axle to the seat for the equalizer bar, which distance may be considered as made up of a constant quantity and a variable quantity. The constant quantity is the distance from the center of the axle to the top of the housing; and the variable quantity is the distance from the top of the housing to the equalizer bar seat. By making the adapter plate at the equalizer bar seat of the same thickness as the minimum of the variable quantity, the adapter plate itself will satisfy all requirements needed when the distance from the axle center to the equalizer bar seat is the minimum. When it is desired to take care of a truck whose equalizer bar seats are above such minimum distance from the axle center, a suitable shim or plate 12 is interposed between the top of the housing and the bottom of the adapter plate. As shown in the drawings, the shim is tack-welded, as at 13, to the axle housing. In some instances, however, it may be desirable to weld or otherwise secure said shim to the adapter plate so that both may be attached to and removed from the truck as a unit.

As the adapter plate is exposed to severe service, it is preferably made of a wear resistant steel of high tensile strength, such as an alloy steel of chromium-nickel-molybdenum. An adapter plate of such metal is quite wear resistant. Besides, my adapter plate is very easily replaceable, as no fastening devices are needed to secure it in place and as it is thin enough to be removed when the truck frame and equalizer bars are jacked up a small distance.

What I claim is:

1. An inboard truck comprising an axle, a housing therefor, wheels rotatably mounted on the ends of said axle beyond said housing, roller bearings inside of said housing between said axle and said housing and adapter plates removably mounted on the ends of said housing in either of two positions wherein their ends are reversed about a vertical axis, the tops of said adapter plates having seats for truck members, which seats are unequal distances from said axis.

2. An inboard truck comprising an axle, a housing therefor, wheels rotatably mounted on the ends of said axle beyond said housing, roller bearings inside of said housing between said axle and said housing and self-locking adapter plates removably mounted on the ends of said housing and reversible end for end thereon about a vertical axis, said plates interlocking with said housing, said adapter plates having seats for truck members, which seats are unequal distances from said axis.

3. An inboard truck comprising an axle, a housing therefor, wheels rotatably mounted on the ends of said axle beyond said housing, roller bearings inside of said housing between said axle and said housing, adapter plates removably mounted on the ends of said housing in either of two positions wherein their ends are reversed about a vertical axis, the tops of said adapter plates having seats for truck members, which seats are unequal distances from said axis, and shims between said housing and said plates whereby the same axle and housing construction may be used with trucks whose equalizer bars are different distances above the axle.

4. An inboard truck comprising an axle, a housing therefor, wheels rotatably mounted on the ends of said axle beyond said housing, roller bearings between said axle and said housing, and adapter plates removably mounted on the ends of said housing and adapted for cooperation with truck members, said adapter plates having downturned end flanges extending below the top of said housing for engagement therewith and said housing having upstanding ribs extending longitudinally thereof and engaging the front and back of said plates.

5. An inboard truck comprising an axle, a housing therefor, wheels rotatably mounted on the ends of said axle beyond said housing, roller bearings between said axle and said housing, adapter plates removably mounted on the ends of said housing and reversible end for end thereon, said adapter plates having interlocking engagement with said housing and having pairs of upstanding ribs near its ends but unequally spaced from the center line of the engaging means.

6. An inboard truck comprising an axle, a housing therefor, wheels rotatably mounted on the ends of said axle beyond said housing, roller bearings between said axle and said housing and endwise reversible adapter plates removably mounted on the ends of said housing and each provided on its top with pairs of ribs adapted for cooperation with truck members, the respective pairs of ribs being unequal distances from a point midway of the engaging means.

7. An adapter plate for use in applying housed axles to trucks of the kind described, the under side of said plate being adapted to rest upon the end portion of the housing and said plate having means for engaging said housing in either of two opposite positions of said plate, and the upper face of said adapter plate having a pair of ribs near each end thereof, the medial vertical plane of such means being offset from the vertical plane midway between said pairs of ribs.

8. An adapter plate for use in applying housed axles to trucks of the kind described, the under side of said plate being adapted to rest upon the end portion of the housing and having means for holding it against movement longitudinally of said housing, and the upper face of said adapter plate having a seat near each end thereof for an equalizer bar, said holding means being unsymmetrical with respect to a line midway between said seats.

TRACY V. BUCKWALTER.